United States Patent [19]

Gamze et al.

[11] Patent Number: 4,510,433

[45] Date of Patent: Apr. 9, 1985

[54] VARIABLE-SPEED CONSTANT-FREQUENCY ALTERNATOR

[76] Inventors: Maurice G. Gamze, 1077 Ridgewood Dr.; Louis H. Sprung, 570 Rambler La., both of Highland Park, Ill. 60035

[21] Appl. No.: 478,505

[22] Filed: Mar. 23, 1983

[51] Int. Cl.³ .......................... H02P 9/42; H02P 9/48
[52] U.S. Cl. ...................................... 322/32; 322/59; 322/61
[58] Field of Search ................... 322/32, 4, 29, 28, 59, 322/61

[56] References Cited

U.S. PATENT DOCUMENTS

| | | | |
|---|---|---|---|
| 3,619,762 | 11/1971 | Pritchard | 322/32 X |
| 4,035,712 | 7/1977 | Yarrow et al. | 322/32 X |
| 4,246,531 | 1/1981 | Jordan | 322/32 X |

OTHER PUBLICATIONS

Rothbart et al., "Development of a Variable Shaft Speed Alternator", U.S. Dept. of Energy Pub., 2/1982, (DOE/ID/12203-T1).

*Primary Examiner*—R. J. Hickey
*Attorney, Agent, or Firm*—Eugene F. Friedman

[57] ABSTRACT

A variable-speed constant-frequency alternator compensating for changes in speed of the prime mover by electromagnetically rotating the rotor's magnetic poles around the rotor. If the prime mover has a rotational speed above or below that required to produce the desired output frequency, the magnetic poles rotate about the rotor in a forward or reverse direction, respectively. To connect the alternator to an external a.c. source, the alternator's controls match its output to the precise amplitude frequency, and phase of the external source. The rotor, for each magnetic pole pair, includes three windings. Three-phase power in these windings, produces the magnetic pole pair and rotates it relative to the rotor. Each winding couples to a flopper circuit having k sets of resistances. The resistances, taken in turn, have an inverse proportionality to the magnitude of the desired sine wave for the three-phase current in the rotor's windings. Coupling these resistances, one at a time, to a constant voltage source creates the equivalent sine wave current for the rotor's windings. A transducer produces the same number of pulses per revolution of the rotor as the number of resistances in the flopper circuit. Insufficient or excessive rotor speed results in the counting of too few or too many pulses. The controller then induces a shifting of the flopper circuit to rotate the magnetic poles on the rotor to maintain the output frequency constant.

29 Claims, 11 Drawing Figures

VARIABLE-SPEED CONSTANT-FREQUENCY ALTERNATOR

BACKGROUND

Alternators producing a.c. power must generally possess an output having a known, constant frequency. Much equipment utilizing that electricity depends upon an a.c. diet having a known, stable frequency. Producing that current of constant frequency imposes severe limitations on the operation of alternators and the engines that power them.

Generally, the output frequency of an alternator depends directly upon the speed at which its rotor turns. If the rotor has a single magnetic pole pair, then the output frequency equals the shaft speed in revolutions per unit time. Where the rotor has n magnetic pole pairs, the output has a frequency n times greater than the rotor speed.

However, maintaining the frequency of the rotor shaft speed usually requires the prime mover to also move at a constant speed. Typically, the prime mover, of course, represents an engine which converts chemical fuel into mechanical rotation. However, the engine operates at a reasonably high level of efficiency only when under an optimum load. Yet, reducing the output required of the alternator still requires the engine to operate at the fixed frequency. When operating under these conditions of reduced load, the engine, maintaining its high speed, suffers a drastic reduction in its efficiency.

With a reduced load, the engine can only maintain efficiency by operating at a lower speed. However, that would deleteriously and unacceptably change the alternator's output frequency.

To allow for the maintenance of engine efficiency under reduced loads, central power plants employ a bank of a large number of alternators, each with its own prime mover. Under conditions of reduced demand, the utility operates only a reduced number of the alternators and shuts down the remainder. Those that remain working continue to experience a load that allows them to operate with reasonable efficiency.

However, the concept of a bank of alternators requires a large central utility. Only this type of installation can avail itself of the notion of operating only a limited portion of its total available generating facilities. Installations with only limited requirements for electricity cannot avail itself of a large number of alternators, operating only those required to efficiently support the load.

Installations which can employ no more than a single alternator at most have attempted to vary the relative speeds between the prime mover and the alternator. Using a gear box, for example, allows the prime mover to operate at different speeds depending upon the load imposed. Changing the gearing ratio allows the alternator to run efficiently and produce the electricity at the required frequency. However, this operation imposes a severe burden on the gear box itself. The gears remain in constant operation and operate under a substantial load. As a result, the gear box regularly wears out at short intervals and require refurbishment or replacement at substantial expense.

The Roesel alternator has attempted to solve the problem by providing an alternator producing a constant frequency at different rotor speeds. The alternator, a description of which appears in *Aviation Week and Space Technology* of Feb. 26, 1973, employs a centrally positioned stator, surrounded by a cylindrical rotor. The latter has a layer of magnetizeable material on its inner surfaces. An exciter head on the stator, in effect, imprints magnetic poles on the layer of magnetizeable material on the cylindrical rotor. The exciter, in fact, creates a sufficient number of poles on the rotor so that the rate at which the fields from these poles pass through the stator coils create the desired a.c. frequency.

However, the Roesel alternator appears to suffer from two limitations. First, the generator would not appear to readily submit to a scaling-up process to increase the total electrical power production. The strength of the magnetic fields created and the necessity of spinning the cylindrical stator appears to impose a limitation on the maximum power efficiently created.

Second, the maximum efficiency for an alternator occurs where the number of pole pairs for the stator equals that for the rotor. A discussion of this concept appears in the paper "The Roesel Generator, A Unique Variable Speed-Constant Frequency Generator" by R. R. Ott, R. J. Barber, and J. F. Roesel, presented at the I.E.E.E. Applied Magnetics Workshop, Marquette University, June, 1975, which discusses it in terms of length of the magnetic pole. As the rotor speed increases or decreases, the exciter prints a lesser or greater number of poles on the rotor, respectively. Only at one particular stator speed do both the stator and rotor have the same number of poles. At any other speed, the alternator loses efficiency. Thus, the Roesel alternator still does not accomplish a highly efficient generation of constant frequency a.c. current with varying rotor speed.

Further, printing and removing of the poles involves magnetizing and demagnetizing the rotor's magnetic material. These operations entail substantial magnetic hysteresis energy losses and, thus, reduced efficiency.

SUMMARY

Electromagnetically rotating the rotor's magnetic pole pairs around the rotor itself will compensate for rotor speeds that would otherwise not produce the desired a.c. frequency. As a consequence, the prime mover may spin the rotor at a velocity having the greatest efficiency for the prime mover. Moving the poles around the rotor, in either a forward or backward direction as required, avoids any deviation in the output frequency notwithstanding changes in the rotor speed.

To generate the alternating current having a frequency of $x$ Hz. involves first moving a wound rotor with n magnetic pole pairs at z revolutions per seconds (rps.). The rotor forms part of an alternator which has a stator possessing m magnetic pole pairs. Here, n and m represent positive integers and, in the most usual and desired situation, equal each other.

To maintain the desired output frequency further requires the instantaneous determination of the rotational speed z of the rotor. Finally, to compensate for a rotor speed z which does not by itself produce the required output frequency, the rotor's magnetic pole pairs undergo electro-magnetic rotation about the rotor at a velocity of $y=(x-z)/n$ rps. This rotational velocity relates to a frame of reference which remains fixed relative to the rotor. The reference frame, however, rotates relative to the stator. Nonetheless, the rotation of the rotor magnetic poles at the indicated velocity of y occurs relative to the rotor.

A variable speed generating device producing the alternating current having the predetermined frequency of x Hz. includes first an alternator. This piece of equipment includes first a wound rotor having n magnetic pole pairs. The stator for the alternator includes m magnetic pole pairs. The letters n and m represent positive integers, almost always equal to each other.

The generating device further requires a prime mover which spins the rotor at a rotational velocity of z rps. relative to the stator. The symbol z stands for a variable real positive number.

To provide the necessary controls, the device includes a measuring instrument which instantaneously determines the rotor's rotational speed z. The prime mover need not maintain this rotational speed z at a particular constant value.

Since the rotor speed z varies, the generator requires a field driver to compensate for rotor speeds which, by themselves, do not produce the desired a.c. frequency. The field driver couples to the measuring instrument and to the rotor's pole pairs. It electromagnetically rotates the rotor magnetic pole pairs about the rotor. In particular, it induces the rotation at the velocity of $y = (x-z)/n$ rps. relative to the rotor.

The accomplished rotation of the magnetic pole pairs on the rotor at the speed of y serves to compensate for the speed at which the prime mover spins the rotor. The forward or reverse movement of the rotor's magnetic pole pairs, relative to the rotor, results in the stator producing an alternating current having the output frequency of x Hz.

To allow for the production of electromagnetically rotating pole pairs, the rotor may include 3n separate windings. Again, n constitutes the number of rotor magnetic pole pairs. In other words, the rotor includes three windings for each magnetic pole pair. Three-phase current in a set of three windings creates a magnetic pole pair. The frequency of the three-phase current establishes the rotational velocity of the magnetic pole pair about the rotor. Reducing this frequency to zero, which in effect creates d.c. current in the windings, causes the magnetic pole pair to remain static relative to the rotor. In this instance, the poles would rotate relative to the stator at the same rotational velocity as the rotor itself.

Three-phase current implies that the current in any one of the three windings differs in phase by 120° compared to the current in the other windings. Thus, it leads one of the other two windings by 120° and lags by the same amount the current in the third winding.

The device for creating a magnetic pole pair rotating about a predetermined center includes a current means, coupled to three windings, to create three-phase current. This current should have the same frequency y as the rotational speed at which the magnetic pole pairs should spin about the center of rotation.

Additionally, the current means includes a controller for each of the three windings. The controller couples to the leads of the winding and includes k configurations where k represents a positive integer. In each configuration, the controller produces a predetermined magnitude of substantially steady amplitude current through the particular winding to which it connects.

The resulting current amplitude as the controller passes through the k configurations, closely approximates a sine wave of frequency y. In other words, the ratio of the magnitude of the currents from the $i^{th}$ and $j^{th}$ configurations substantially equals the ratio of the values of a sinusoidal wave at the phase angle positions i/k and j/k through a cycle of the wave. Naturally, i and j represent positive integers not greater than k.

The current means must then include a switching device coupled to the controller. This serves to switch the controller from the $i^{th}$ configuration to the $(i+1)^{th}$ configuration for each $i \leq k$. The $(k+1)^{th}$ configuration represents the first configuration to create a continuing sinusoidal wave.

Lastly, the current means includes a current timer coupled to the switching device. The timer induces the switching device to transfer from the $i^{th}$ configuration to the $(i+1)^{th}$ configuration at the instantaneous rate of (ky) switches per second. In other words, the simulated sinusoidal wave has k portions, with k switches representing one complete cycle of the sinusoidal wave. (ky) switches per second creates y sinusoidal waves in this period of time. Accordingly, a.c. power having a frequency of y Hz. results in the magnetic pole pair, which, thus, rotates at a frequency of y.

The k configurations may make use of a set of k resistances each coupled to the same source of d.c. potential. The controller, in each configuration, actually completes the connection of the particular resistance to the voltage source and decouples the others. The appropriate selection of the resistances will result in an a.c. sinusoidal current as the switcher couples each of the k resistances in turn and repeats the cycle at the desired frequency.

DETAILED DESCRIPTION

Figure 1:
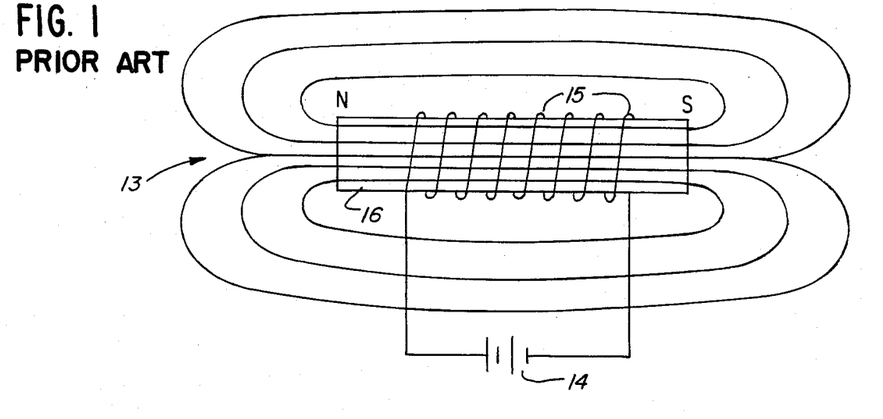
FIG. 1 shows the creation of a standard, single pole-pair electromagnet.

FIG. 1 shows, very simplistically, an electromagnet generally at 13. Briefly, the electromagnet includes a source of voltage 14 pushing an electric current through the coil 15. The resulting magnetic force, concentrated in the bar 16, creates the north N and south S poles. Typically the bar 16 takes the form of a soft iron core.

Figure 2:
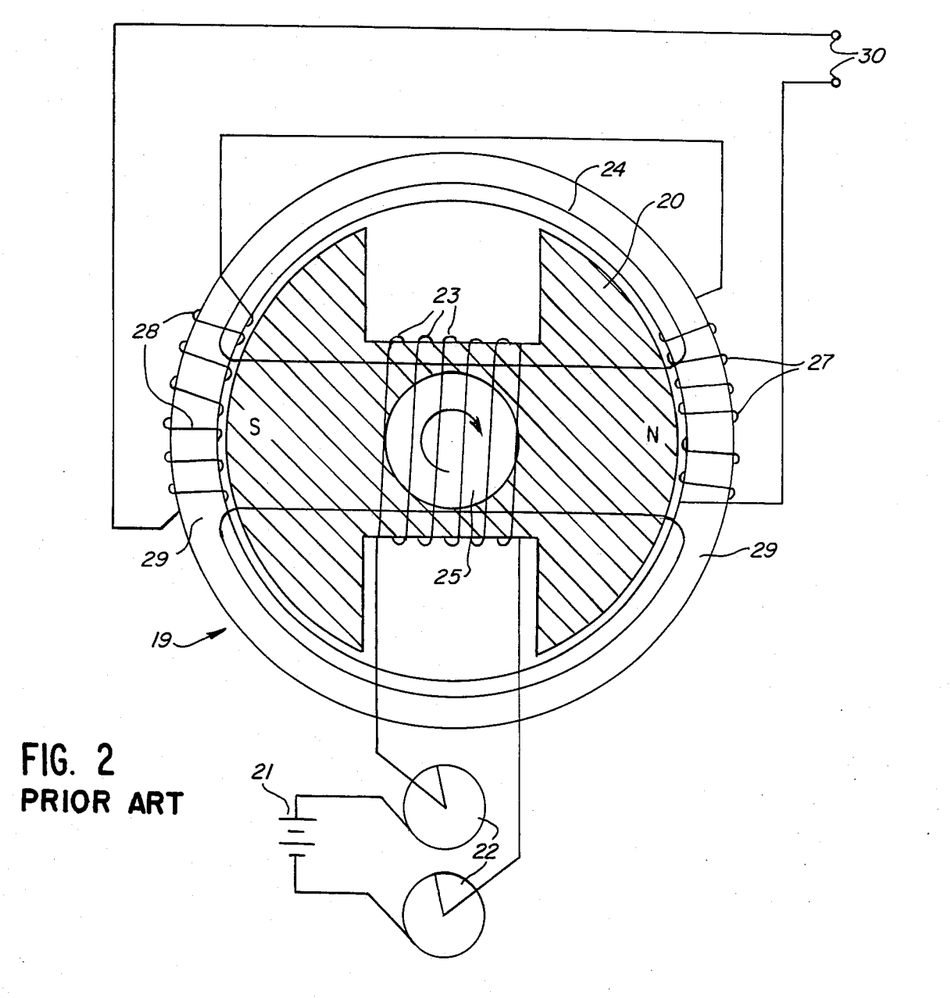
FIG. 2 portrays a simple alternator having a rotor with a single pole pair winding.

The use of an electromagnet as described in FIG. 1 for an elementary alternator generally at 19 appears in FIG. 2. The alternator 19 includes the rotor 20, again composed of magnetizeable metal, usually silicon steel. Again a source of d.c. potential 21 supplies current, through the slip rings 22, to the rotor winding 23. The current in the winding 23 creates the magnetic poles N and S in the rotor 20. The semicircular paths 24 show the lines of the magnetic force field.

As suggested by its name, the rotor 20 undergoes rotation on its shaft 25. The energy required to create the electricity finds its primary use, of course, in driving the shaft 25 to effectuate the rotation of the rotor 20. The slip rings 22 maintain contact between the leads of the coil 23 and the potential source 21 notwithstanding the rotor's spinning.

As the rotor 20 revolves, the field from its magnet, illustrated by the lines 24, pass through the coils 27 and 28 on the stator 29. The magnetic field moving through these coils create an alternating current at the output 30. This a.c. output has the same frequency in Hertz as the rotor 20 has in revolutions per seconds (rps.).

Many electrical devices require a.c. having a known frequency. In fact, the usual electrical clocks base their timing upon the number of cycles it receives in its input current. As a consequence, the shaft 25 must rotate the rotor 20 at a constant, known frequency.

However, a small load appearing across the output 30 requires the prime mover, or engine, to maintain the rotation of the shaft 25 at the same fixed frequency as with a heavy output, but with very little power provided by it. The prime mover engine, operating at a fixed speed but under low load, loses much of its efficiency.

Figure 3:
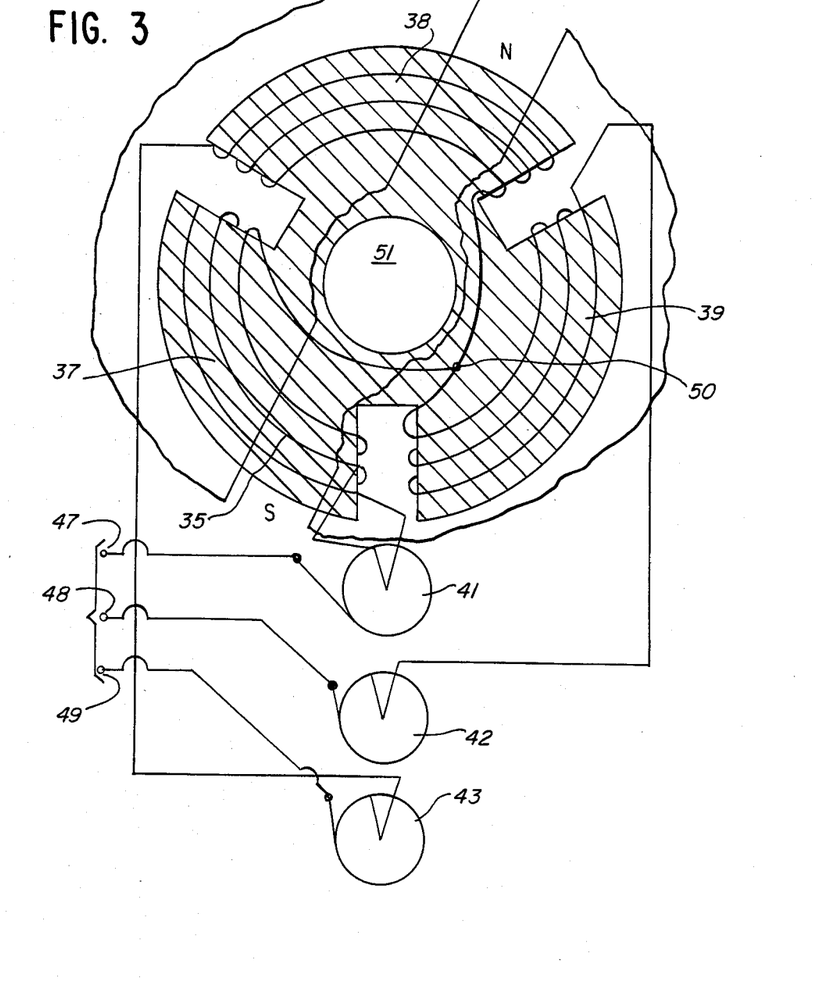
FIG. 3 gives an alternator rotor having a three-phase, two-pole winding in which the magnetic pole pair may rotate relative to the rotor.

A rotor 35 for an alternator which does not require its prime mover to run at a constant speed appears in FIG. 3. The rotor 35 includes the three windings 37, 38, and 39 coupled through the slip rings 41, 42, and 43 to the three input leads 47, 48, and 49 of three-phase, a.c. power. The other ends of the three windings 37, 38, and 39 connect to each other at the point 50 since the sum of the current in the three windings remains at zero. Alternatively, the point 50 could itself connect a ground through a slip ring.

Figure 4:
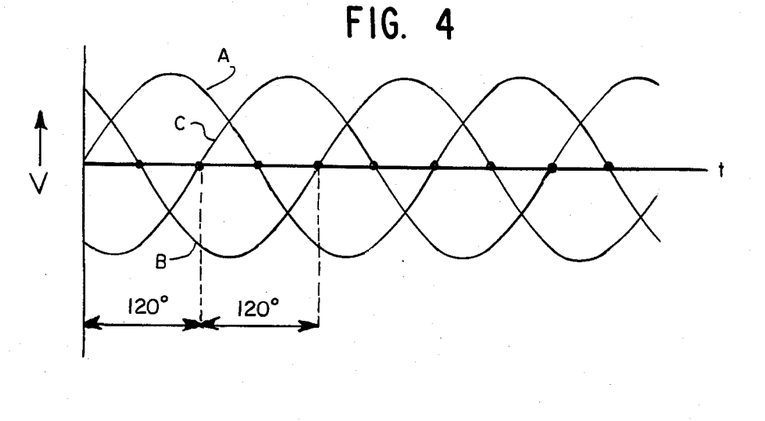
FIG. 4 shows the phase relationships in the three conduits in three-phase power.
Figure 5:
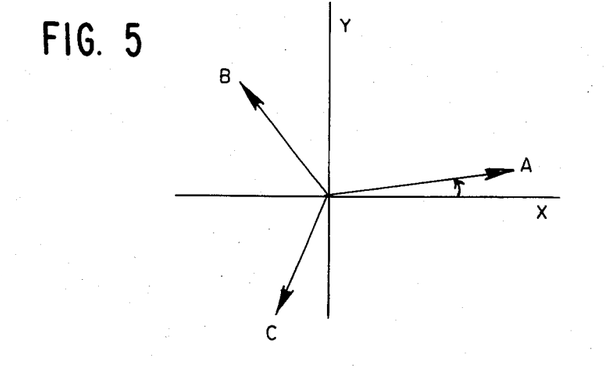
FIG. 5 provides a vector representation of the current magnitudes in three-phase power.

Three-phase power, in general and as used in the present context, signifies alternating current appearing on three separate leads as shown in FIGS. 4 and 5. The current in the three leads of three-phase power, illustrated diagrammatically as A, B, and C in these two figures, differs by 120° from the phase of the current in the other two leads. In other words, the phase on the line A leads that on the line C by 120° and lags behind lead B by the same amount.

FIG. 4, in particular, shows the instantaneously voltage V on each of the three leads as a function of time t. FIG. 5 gives the same effect but in a somewhat different representation. There, the magnitude of the current in each of the leads appears as the ordinate component of the vectors A, B, and C. These three vectors, separated from each other by 120°, rotate about the center in the x-y plane at the same frequency as the current shown in FIG. 4.

Returning to FIG. 3, the three-phase power on the windings 37, 38, and 39 of the rotor 35 creates a single magnetic pole pair consisting of the north pole N and the south pole S. However, this magnetic pole pair N-S rotates around the rotor at the frequency of the three-phase current in the windings 37 to 39. Relative to the stator, the speed at which the magnetic pole pair N-S rotates consists of the algebraic sum of its rotation relative to the rotor 35 plus the rotation of the rotor 35 relative to the stator.

The triple windings 37 to 39 carry three-phase power to create the magnetic pole pair N-S. They also permit the construction of an alternator having an output frequency which does not depend upon the speed at which the prime mover rotates the shaft 51 of the rotor 35. Rotating the magnetic pole pair N-S about the rotor 35 permits the compensation for the deviation of the rotational speed of the rotor 35 from that required to produce the desired a.c. output frequency.

For example, to produce the usual 60 Hz. current with a rotor with a single pole pair typically requires a shaft rotational speed of 60 rps. However, if the shaft speed should fall to 40 rps., the rotor of FIG. 3 can still produce 60 Hz. a.c. by rotating the magnetic pole pair N-S about the rotor 35 at 20 rps. The output will have the sum of these two frequencies, or 60 Hz. Similarly, if the shaft speed exceeds 60 rps., the magnetic pole pair N-S may rotate in the opposite direction to compensate for the excess. Thus, a shaft speed of 65 rps. will receive compensation by having the magnetic pole pair N-S rotate in the reverse direction at 5 rps.

Maintaining an output frequency x requires a controller that will provide the windings 37 to 39 with the three-phase a.c. power which will rotate the magnetic pole pair N-S. An outline of this type of control system appears in FIG. 6. The prime mover 55, such as a natural gas or gasoline engine, connects to and rotates the shaft 56, which in turn induces rotation of the rotor of the alternator 57. As a result of this rotation, the alternator 57 produces an a.c. output on the line 58.

Figure 6:
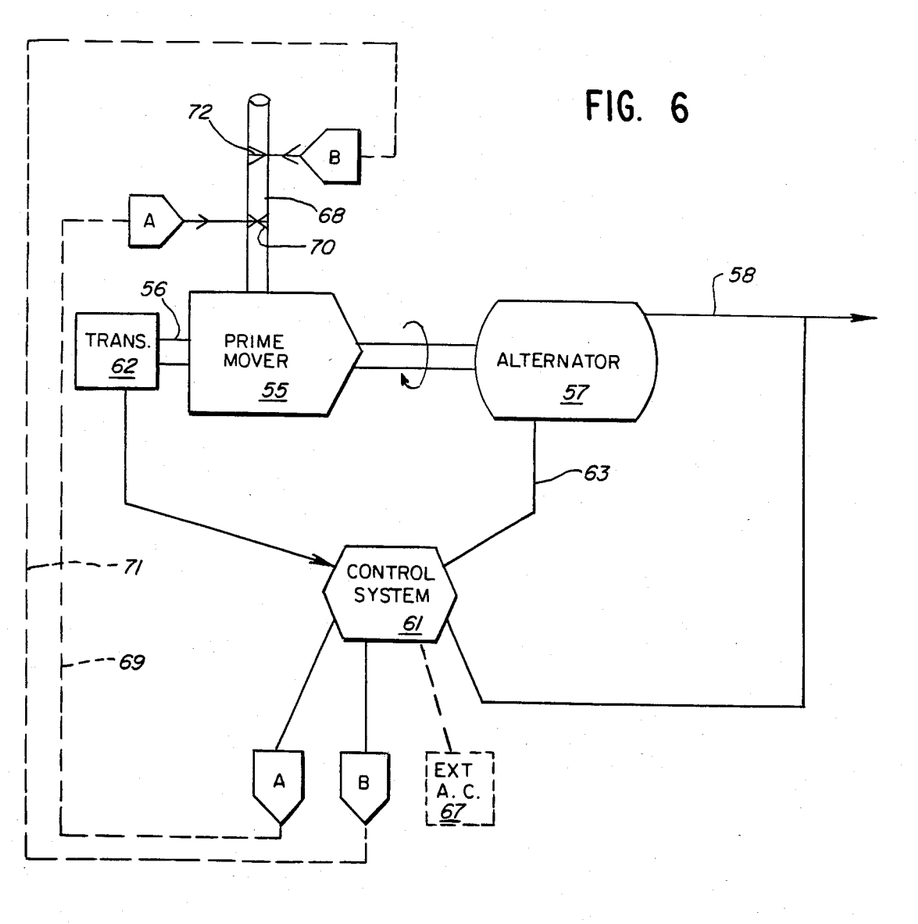
FIG. 6 diagrams the components of a system providing constant-frequency a.c. power from a prime mover operating at variable speeds.

The control system 61 serves to maintain the desired frequency of the output current on the line 58 regardless of variations in the rotational speed of the rotating shaft 56. To accomplish this task, the controller 61 connects to the transducer 62 which couples to and determines the rotating speed of the shaft 56. From the information provided by the transducer 62, the controller 61, coupling to the alternator 57 through the line 63 induces a forward or reverse rotation of the rotor's magnetic poles. The algebraic sum of the velocity of the shaft 56 and the rotating magnetic poles of the rotor create an a.c. output having the correct frequency.

The controller 61 may decide upon the desired frequency for the output a.c. on the line 58 in different ways. First, it may simply have a preset, nonvarying number x at which the output frequency should always remain. For example, a controller may simply determine that the a.c. output on the line 58 will remain at 60 Hz. at all times.

Alternatively, the controller may determine the desired output frequency relative to an external source. It may choose this option where the output 58 connects to, for example, an external source of a.c. power. This occurs frequently in the case of connecting an individually owned, small generator to a utility's power grid. In that case, the control system 61 has a connection to the source of external a.c. power as shown at 67. The controller 61 then determines the frequency of the external a.c. power. It uses the information to control the rotation of the magnetic poles about the rotor of the alternator 57. As a result, the alternator's output on the line 58 matches in frequency the external a.c. power.

The controller 61 may also guide other auxiliary functions. In particular, it may have connections to the fuel source 68 for the prime mover 55. In particular, the A connection along the conduit 69 may regulate the flow control valve 70 of the fuel input 68. The controller may undertake this task in order to keep the prime mover 55 operating at a level of reasonable efficiency.

Secondly, the controller, through the B connection along the conduit 71, may connect to an emergency cutoff valve 72. In the case of a detected emergency, the controller would simply activate the emergency cutoff 72 and shut down and disconnect the alternator system.

Figure 7:
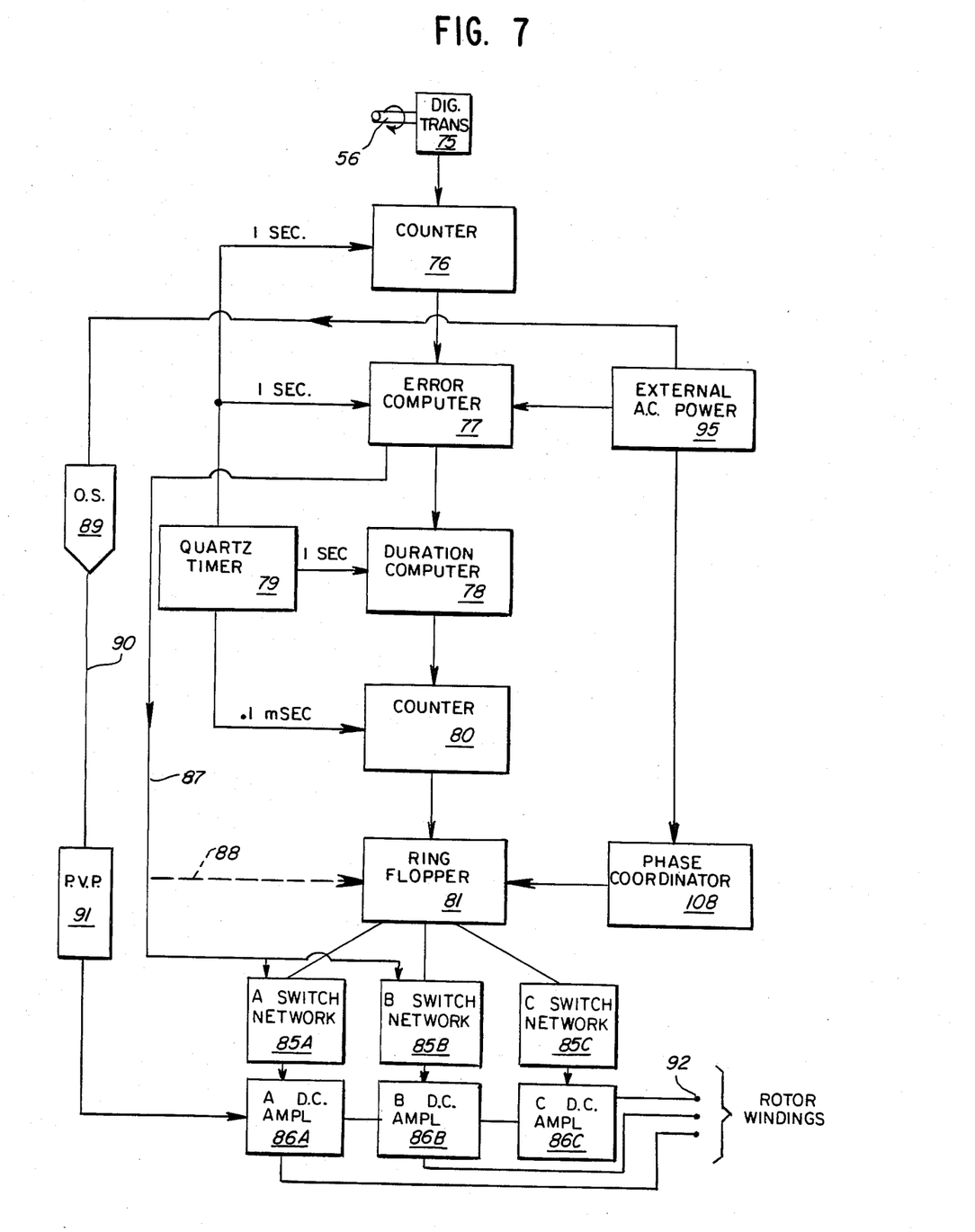
FIG. 7 provides a diagrammatic representation of the alternator control system for providing constant-frequency a.c. power from a prime mover operating at variable speeds.

FIG. 7 provides details of a control system, operating digitally, which serves to create the appropriate three-phase a.c. power in the rotor's windings. Specifically, it controls the frequency of this a.c. power, and, thus, the speed and position of the magnetic poles as they rotate about the rotor. Additionally, the system of FIG. 7 also maintains the amplitude of the a.c. output at a desired level. Lastly, the system can also match the phase of its output to that of an external source of a.c. power.

As suggested with the generalized system of FIG. 6, the controller of FIG. 7 uses the digital transducer 75 coupled to the rotating shaft 56 and measuring its speed. In particular, the transducer 75 creates k pulses per revolution of the shaft 56. For the purposes of controlling the alternator, the transducer 75 should create and count at least about 50 pulses per shaft revolution. A larger number, such as 100 pulses per revolution, will allow more accurate control of the current phase passing through the alternator's rotor.

The counter 76 receives the pulsed output of the transducer 75 and accumulates a total of these pulses over a preset period of time. For example, it may simply count the number of pulses arriving in a one-second period.

The error computer 77 receives the output of the counter 76. It computes this with the number of the pulses the transducer 75 would create if the shaft 56 rotated at the exact speed that would, by itself, produce the desired output frequency. For example, desiring 60 Hz. output and utilizing a rotor having a single pole pair, the shaft 56 would have to rotate at 60 rps. If the transducer 75 produces 100 pulses per revolution, the counter 76 would tabulate 6,000 pulses per second. Naturally, if the rotor had n pole pairs, then the counter 76, for 60 Hz. output produced solely by the rotation of the shaft 56, would accumulate 6000/n pulses per second. For a rotor having three pole pairs, i.e. six poles including three north and three south poles, the number becomes 2,000 pulses per second.

However, the system of FIG. 7 has the purpose of allowing the shaft 56 to rotate at speeds other than the one speed which, by itself, would produce the desired output frequency. Thus, it may go faster or slower, depending on the load. In that eventuality, the counter 76 would accumulate a different number of pulses in each second. The error computer 77 determines the difference between the pulses actually produced and the number the counter 76 would receive were the shaft 56 operating at the speed at which it also would create the desired frequency output. The error computer 77 produces a larger number, for greater deviations of the shaft speed 56 from that which will produce the desired a.c. output. Thus, for example, if the shaft 56 rotates at 50, rather than 60, rps. for a desired 60 Hz. output with a single pole pair, the error computer will produce an output of 1,000. This represents the number of error pulses per second. The figure derives from the difference of 10 rps. between the actual and the needed shaft speed to produce the desired a.c. output times the 100 pulses per revolution produced by the transducer 75.

The remainder of the system in FIG. 7 uses this number, which represents the error pulses per second, to control the frequency and the direction at which the poles rotate about the rotor. The larger the number of error pulses per second, the faster will the magnetic poles rotate about the rotor.

In the simplest terms, the remainder of the circuit creates, in sections, simulated sinusoidal a.c. waves in the rotor windings. In particular, one complete cycle of the sine waves may have the same number of sections as the pulses produced by the transducer 75 for a single rotation of the shaft 56. Thus, the system creates one complete a.c. cycle on the three-phase power in 100 steps where the transducer 75 creates 100 pulses per turn of the shaft 56.

Further, the circuit drives the three-phase power one step in the forward or reverse directions for each insufficient or additional pulse produced by the transducer 75. In this fashion, the rotor's magnetic poles rotate about the rotor in the proper direction and with the correct speed. As a result, they precisely compensate for any deviations of the speed of the shaft 56 from that required to produce the desired a.c. frequency output. Thus, notwithstanding such deviations or changes in the speed of the shaft 56, the alternator continues to produced the desired frequency of a.c. output.

Proceeding in FIG. 7, the number produced by the error computer 77 and representing the number of error pulses per second travels to the duration computer 78. The latter element effectively takes the reciprocal of the error pulses per second received from the error computer 77. This reciprocal represents the pulse interval, or the time at which the a.c. current in the rotor windings should be pulsed to its next level. The resulting a.c. sine wave thus creates the rotating magnetic poles.

For convenience and accuracy, rather than dividing the error pulse per second in the error computer 77 into one, the duration computer 78 divides it into 10,000. The resulting number, larger by four orders of magnitude, serves to control the timing of the a.c. power in the rotor windings. The number, in particular, represents the tenths of milliseconds between the pulses which create the rotor exciter current.

To provide the required timing of the element 76, 77, 78, as well as other sections of the circuit, the system includes the quartz timer 79. The timer 79 provides a pulse each second to the counter 76, the error computer 77, and the duration computer 78. It provides pulses at the interval of 0.1 msec. to the counter 80. The counter 80 simply counts the number of 0.1 msecs. received from the timer 79 until the total equals the figure it received from the duration computer 78. At that point, the a.c. current in the rotor exciter windings steps to its next value in the simulated sine wave.

To achieve this result, the counter 80, at this time, produces an output stepping pulse to the ring flopper 81. It simultaneously resets itself to zero and starts the count over. The counter 80 thus produces a series of spaced pulses at the times that the current in the rotor exciter winding should proceed along to the next step in the created a.c. sine wave.

Figure 8:
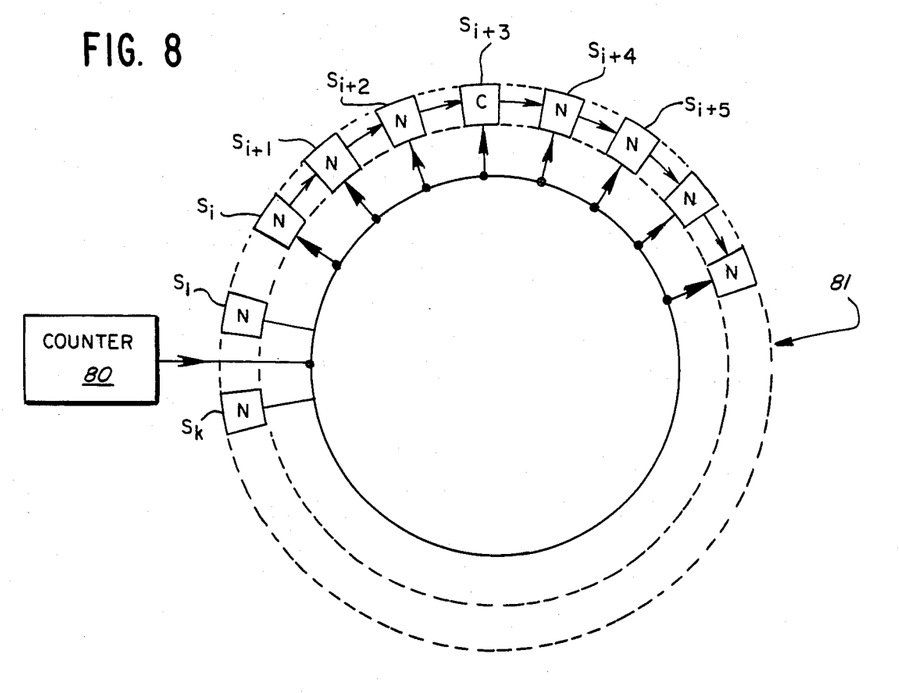
FIG. 8 shows an outline of a flopper circuit which, upon receipt of pulses, produces a simulation of a sine wave.

As illustrated in FIG. 8, the ring flopper includes k bistable switching elements $s_1, \ldots s_i, \ldots s_k$. Only one of these bistable elements, $s_{i+3}$, in FIG. 8, exists in the conducting C state. The others remain in the off or nonconducting N state.

Figure 9:
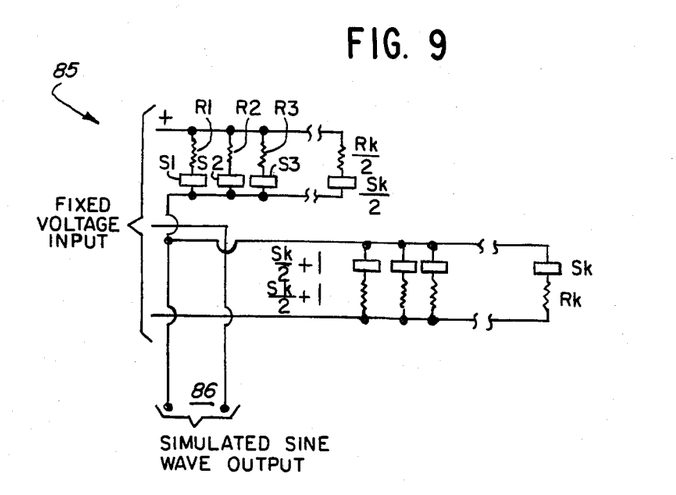
FIG. 9 shows a circuit, operating on the flopper circuit of FIG. 8, for producing a simulated a.c. wave.

Each bistable switch $s_i$ in the flopper 81 connects to a resistance $r_i$ in the switching network 85 of FIG. 9. Each pulse received from the counter 80 on the lead 84 in the flopper 81 induces the then conducting switch $s_{i+3}$ in FIG. 8 to turn off and the next switch $s_{i+4}$ to turn on and conduct.

Figure 10:
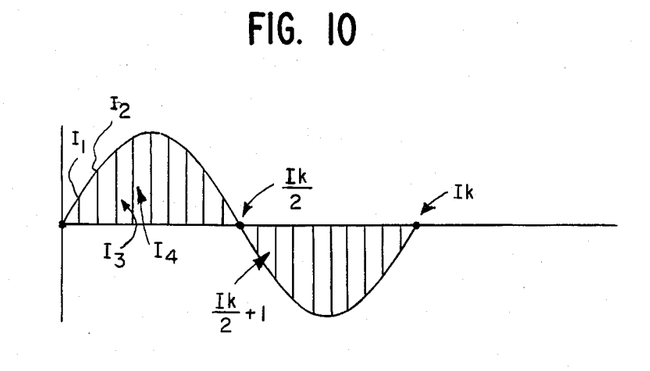
FIG. 10 shows the results of the operation of the circuit of FIG. 9.

The various resistances, $r_1, \ldots r_i, \ldots r_k$, when connected by their respective switches to the fixed input voltage, produce different currents. Taken together and in turn, the currents through the different resistances $r_1, \ldots r_k$ approximate a sine wave as shown in FIG. 10. Thus, succeeding pulses from the counter 80 causes the conducting switch to travel around the flopper circuit of 81 in FIG. 8. As it does so, it turns on a single resistance at a time in the switching network 85 of FIG. 9. The voltage across the single resistance appears as a current at the output 86. The changing currents as the different resistances connect to the voltage through the different switches approximate a sine wave as shown in FIG. 10.

In FIG. 8, after the switch $s_k$ has turned on, the next pulse from the counter 80 causes it to turn off and the switch $s_1$ to turn on to start the next cycle of the a.c. wave shown in FIG. 10. The timing of the pulses received from the flopper 81 controls the sine wave shown in FIG. 10. In particular, the latter will have the frequency that will cause the magnetic poles to rotate around the rotor at a frequency that will produce the correct output frequency.

Generally, the number of switches k in the ring flopper 81 equals the number of pulses produced by the transducer 75 for a single, complete rotation of the shaft 56. In this instance, the flopper 81 induces a switch when the digital transducer 75 varies by one pulse from the number of pulses it should produce were the shaft speed 56 able to maintain the required a.c. frequency. In other words, the algebraic sum of the pulses from the digital transducer and the switching of the ring flopper 81, divided by the number k, equals the output frequency x divided by n, the number of pole pairs on the rotor. Stated symbolically:

$$(p_t + p_f)/k = x/n$$

where $p_t$ and $p_n$ represent the number of pulses produced, respectively, per unit time by the transducer 75 and by the counter 80, respectively, for the flopper 81.

As seen in FIG. 7, this system includes three switching networks 85A, 85B, and 85C, to allow for separate control of the three windings for a magnetic pole pair on the rotor. From each of the switching networks 85A-C, the resulting current, as shown in FIG. 10, travels to the d.c. amplifiers 86A, 86B, and 86C. These in turn control the amplitude of the current on the rotor's windings to produce the appropriate field strengths for the magnetic poles. The field strengths, in turn, determine the magnitude of the a.c. output voltage.

The foregoing discussion has assumed that the magnetic poles travel in one direction about the rotor. However, as the rotor changes from below a speed of that which will produce the desired output frequency to a speed above, or vice versa, the phasing of the current in the windings must also invert. FIG. 7 shows one method for accomplishing that result. The error computer 77 provides a signal on the phase line 87 to the two switching networks 85A and 85B. The signal along the line 87 simply inverts the voltage produced by these two networks. That has the effect of reversing the direction of rotation of the magnetic poles around the rotor. As a result, the rotation of the magnetic poles will change between increasing the effective frequency of the rotor speed to decreasing it.

Alternatively, the signal on the phase line 87 could traverse the phantom connection 88 to the ring flopper 81. The information on the line 88 could simply cause the flopper to change the direction which the flopper circuit 81 travels in turning on the one conducting switch. Thus, instead of going from $s_i$ to $s_{i+1}$, the reverse direction would cause it to go to $s_{i-1}$.

Further, the circuit also includes the voltage output sensor 89 which measures the amplitude of the a.c. output. The output sensor travels along the lead 90 to the peak voltage processor 91. The resulting control signal passes along the lead 92 to the d.c. amplifiers 86A, 86B, and 86C which control the amplitude of the current at the connections 92 for the rotor windings.

The system of FIG. 7 described thus far suffices for an alternator in an electrically isolated system. However, such equipment often has a connection to a utility's power grid. This type of connection requires the alternator's output to match the external source of a.c. power in voltage, frequency, and phase.

To control the amplitude, the output voltage sensor 89 also connects to the external a.c. power 95. The signal from the output sensor 89, on the lead 90, induces the d.c. amplifiers 86A-C which controls the alternator's output amplitude to match the external a.c.

To control the frequency, the error computer 77 also couples to the external a.c. power 95. In this instance, the error computer 77 no longer compares the results of the counter 76 to a predetermined fixed number characteristic of a particular frequency output. Rather, the error computer 77 determines the frequency of the external a.c. power 95. It then calculates the number to which it compares the results it obtains from the counter 76. Thus, if the external power 95 has a frequency of 50 Hz., the error computer 77 will use, as its comparison number, 5,000. In other words, it will compare the 100 pulses per rotation of the digital transducer resulting from the rotation of the shaft 56 to 5,000 rather than 6,000 which it would use for a presumed 60 Hz. output. By continuously recalculating the target number from the external a.c. power source, the frequency of the alternator will remain equal to the external a.c. power 95.

Figure 11:
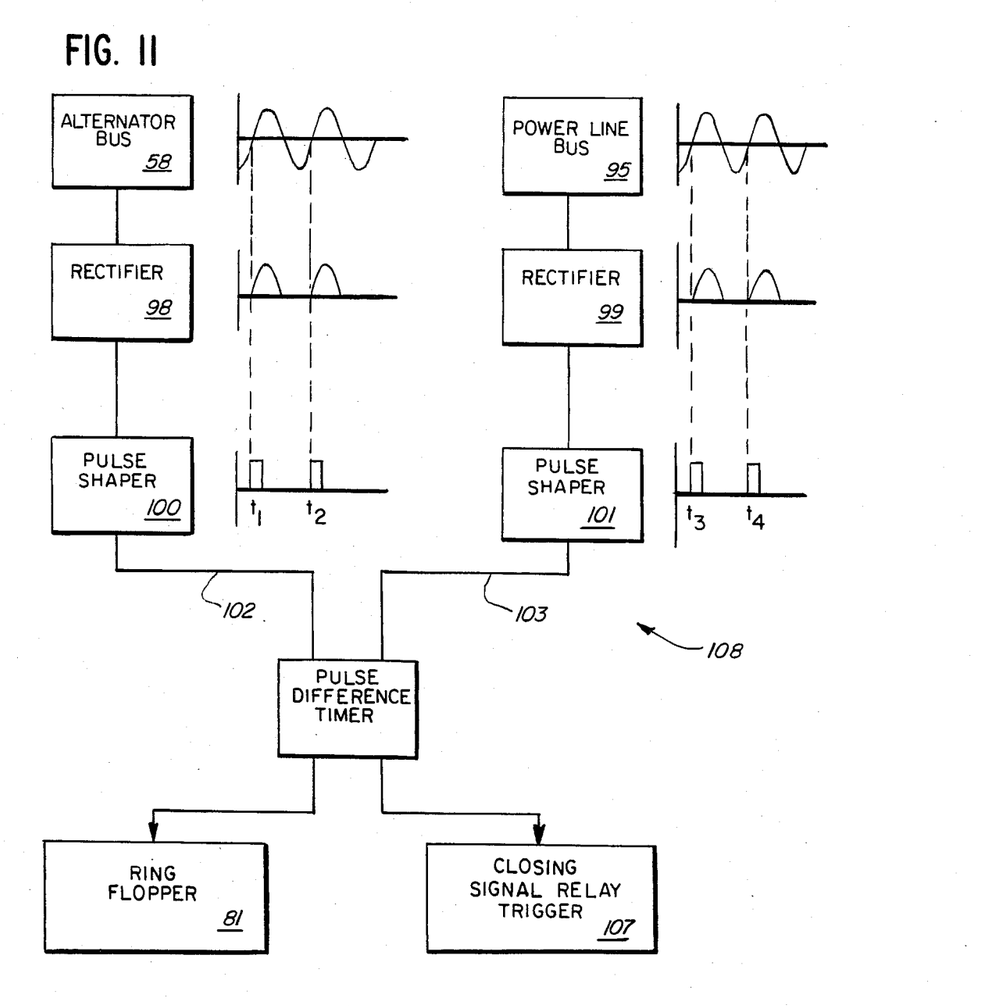
FIG. 11 diagrammatically portrays a circuit for synchronizing the phase of the generated a.c. output with that on an external source of current.

FIG. 11 shows a circuit that will match the phase of the alternator's output with the external a.c. power. Both the alternator output 58 and the power line 95 have sinusoidal wave alternating current. The half wave rectifiers 98 and 99 eliminate half the signal as shown in the wave forms next to them. The pulse shapers 100 and 101 convert the half sine waves into square pulses commencing at the time that the half waves cross the zero line. Thus, the result of the pulse shaper 100 on the lead 102 include the two square pulses at the times $t_1$ and $t_2$. Similarly, from the power line pulse shaper 101 on the connection 103 appear the two square pulses at the times $t_3$ and $t_4$. The pulse difference timer 106 then measures the interval between a pulse from the alternator shaper 100 until the next pulse from the power line shaper 101. The timer 106 performs this operation repeatedly. For example, it may do so at least five times each second.

The time interval between the pulses from the two shapers 100 and 101 then undergoes comparison to a standard length of time between two pulses from the transducer 75. More exactly, the standard interval assumes the operation of the alternator at the speed which, by itself, would produce the desired a.c. frequency. For a single pole pair rotor operating at 60 cycles per second in a transducer having 100 pulses per turn, this time interval amounts to 167 microseconds per pulse.

If the interval between the two pulses at the timer 106 exceeds this interval, then the timer 106 provides a signal to the ring flopper 81 to switch from $s_i$ to $s_{i+1}$. This will continue until the interval from the two pulses from the timer 106 becomes less than that for the standard time interval of 167 microseconds. This technique does not require changing the prime mover speed to bring the two phases into alignment.

Once accomplished, the timer provides a signal to the closing signal relay trigger 107. This takes the phase coordinator circuit 108 of FIG. 11 out of the control system and allows for the normal control of the a.c. current in the rotor windings.

The foregoing discussion has centered upon an alternator whose rotor has a single magnetic pole pair. In other words, it has one North pole and one South pole. The rotor, however, may actually include n pole pairs. Often times, n may equal three. Thus, for each revolution of the rotor, the magnetic fields of three pole pairs intersect the coils. The resulting current has a frequency three times as great as for a rotor with a single magnetic pole pair. Thus, to produce the same output, a rotor with three pole pairs, for example, need spin only one third as fast as a rotor with a single pole pair. As suggested in the BACKGROUND section above, efficiency generally suggests that an alternator have the same number of rotor and stator magnetic pole pairs.

Utilizing the generalization of n rotor magnetic pole pairs, a rotational velocity of z rps. for the rotor, and a desired output frequency of x Hz., the rotor's magnetic poles must rotate around it at a rotational velocity $y = (x-z)/n$ rps. The quantity $(x-z)$ may assume a positive, negative, or zero value. In these instances, the magnetic pole pairs should rotate in the same direction, the opposite direction, or no direction compared to the rotation of the rotor itself.

Furthermore, where the flopper 81 has k switches, then it must move from one switch to the next at the rate of (ky) switches per second. Where the switching proceeds either in the forward or reverse direction, then the value of (ky) will have a positive value, respectively.

In the figures, aside from the transducer 75, the switch networks 85A-C and the amplifiers 86A-C, the components utilize digital, logic techniques and components. Accordingly, the circuit does not rely upon analogue components which can change in value over a course of time.

The prime mover 55 in FIG. 6 may actually take the form of a separate motor constrained to operate at one or more frequencies different than the desired output. For example, linear alternators have recently witnessed substantial development. Typically, they produce a single cycle of alternating current for each piston stroke. Thus, producing 60 Hz. power requires a constant speed of the linear alternator at 3,600 strokes per minute. As suggested above, the alternator loses efficiency drastically if forced to operate at this speed regardless of the load imposed on the output.

To allow for greater efficiency of the alternator, its output may travel to a synchronous engine. The rotational speed of this engine will match the free piston's stroking rate. The synchronous engine may then couple to the rotor of the alternator shown in FIG. 6. Thus, the linear alternator coupled to the synchronous engine, in combination, constitutes the prime mover 55.

Accordingly, what is claimed is:

1. A variable-speed, predetermined frequency of x Hz., where $x > 0$, alternating-current generating device comprising:

(A) an alternator having:
 (1) a wound rotor with n magnetic pole pairs; and
 (2) a stator having n magnetic pole pairs, where n is a positive integer;

(B) prime mover means, coupled to said rotor, for moving said rotor at a rotational velocity of z rps., where z is a variable real number, relative to said stator;

(C) transducer means, coupled to said rotor, for producing h pulses per revolution of said rotor, where h is a positive integer;

(D) driving means, coupled to said transducer means and to said rotor pole pairs, for electromagnetically rotating said rotor pole pairs about said rotor at a rotational velocity of $y = (x-z)/n$ rps. relative to said rotor, said driving means including:
 (1) for each of said n rotor pole pairs three windings spaced substantially equidistant about said center of rotation;
 (2) for each particular winding of the three particular windings of a particular pole pair, current means, coupled to said particular windings for creating an ac., sinusoidal current in each of said particular windings with a frequency of v Hz., said current in any one particular winding being 120° in phase ahead of the ac. current in one of the remaining two particular windings and 120° in phase behind the current in the other of the remaining two particular windings, said current means including for each one of said particular windings:
 (a) a current controller, coupled to the leads of said one particular winding, having k configurations, where k is a positive integer, and producing a predetermined magnitude of substantially steady amplitude current through said one particular winding for each of said configurations, the ratio of said magnitude of said current with said current controller in the $i^{th}$ configuration to said magnitude of said current with said current controller in the $j^{th}$ configuration, where i and j are positive integers not greater than k, substantially equals the ratio of the values of said sinusoidal wave at the phase angle positions i/k and j/k through a cycle of said wave;
 (b) current switching means coupled to said current controller, for switching, for each $1 \leq i \leq k$ said current controller from said $i^{th}$ configuration to said $(i+1)^{th}$ configuration where the $(k+1)^{th}$ configuration is the first configuration;
 (c) current timing means, coupled to said current switching means and to said transducer means, for inducing said switching means to switch from said $i^{th}$ configuration to said $(i+1)^{th}$ configuration at an instantaneous rate equal to the absolute value of (ky) switches per second; and (d) current reversing means, coupled to said controller and said transducer for inverting the direction of the change of phase of the current in said particular three windings when y goes from positive to negative and when v goes from negative to positive.

2. The device of claim 1 wherein x does not vary over time.

3. The device of claim 1 including varying means, coupled to said field driving means, for changing the value of x.

4. The device of claim 3 including setting means coupled to said varying means and to an external source of a.c. current for (1) determining the frequency of said a.c. current in said external source and (2) setting the value of x at said frequency of said a.c. current in said external source.

5. The device of claim 1 wherein said field driving means includes:

(A) for each of said n rotor pole pairs, three windings spaced substantially equidistant about said center of rotation;

(B) for each particular winding of the three particular windings of a particular pole pair, current means, coupled to said particular windings, for creating an a.c., sinusoidal current in each of said particular windings with a frequency of y Hz., said current in any one particular winding being 120° in phase ahead of the a.c. current in one of the remaining two particular windings and 120° in phase behind the current in the other of the remaining two particular windings, said current means including, for each one of said particular windings:

(1) a current controller, coupled to the leads of said one particular winding, having k configurations, where k is a positive integer, and producing a predetermined magnitude of substantially steady amplitude current through said one particular winding for each of said configurations, the ratio of said magnitude of said current with said current controller in the $i^{th}$ configuration to said magnitude of said current with said current controller in the $j^{th}$ configuration, where i and j are positive integers not greater than k, substantially equals the ratio of the values of said sinusoidal wave at the phase angle positions i/k and j/k through a cycle of said wave;

(2) current switching means, coupled to said current controller, for switching, for each $1 \leq i \leq k$, said current controller from said $i^{th}$ configuration to said $(i+1)^{th}$ configuration where the $(k+1)^{th}$ configuration is the first configuration;

(3) current timing means, coupled to said current switching means and to said transducer means, for inducing said switching means to switch from said $i^{th}$ configuration to said $(i+1)^{th}$ configuration at an instantaneous rate equal to the absolute value of (ky) switches per second; and (4) current reversing means, coupled to said controller and said transducer for inverting the direction of the change of phase of the current in said particular three windings when y goes from positive to negative and when y goes from negative to positive.

6. The device of claim 5 wherein k is at least about 50.

7. The device of claim 6 wherein h is equal to k.

8. The device of claim 7 wherein said current controller further includes pulsing means, coupled to said current switching means, for providing input pulses to said current switching means, and wherein said current switching means, upon the receipt of one of said input pulses, switches said current controller from said $i^{th}$ configuration to said $(i+1)^{th}$ configuration.

9. The device of claim 8 wherein said pulsing means produces one of said input pulses at the rate equal to the absolute value of $k(x-z)$.

10. The device of claim 9 wherein each of said k configurations of said current controller includes for each of said particular windings, a resistance, coupled to said particular winding of said particular pole pair and to a source of voltage, said source of voltage being substantially the same for each of said resistances for each of said k configurations, the ratio of the value of the resistance for said $i^{th}$ configuration to the value of the resistance for said $j^{th}$ configuration substantially equaling the inverse of the ratio of the value of said sinusoidal wave at the phase angle positions i/k and j/k through a cycle of said wave.

11. The device of claim 10 wherein said current controller, when in said $i^{th}$ configuration, passes current from said voltage source through said $i^{th}$ resistance and through none of the other k resistances for said particular winding.

12. The device of claim 11 wherein k is no less than about 100.

13. The device of claim 10 wherein said current reversing means includes phase inverting means, coupled to two of said three particular windings and to said transducer, for inverting the phase of the current in said two particular windings.

14. The device of claim 10 wherein said current reversing means is means for inducing said current switching means to switch, for each $1 \leq i \leq k$, said current controller from said $i^{th}$ configuration to said $(i+1)^{th}$ configuration, when $x>z$ and to said $(i-1)^{th}$ configuration when $x<z$, where the $o^{th}$ configuration is the $k^{th}$ configuration, and for inducing said current timing means to induce said switching means to switch from said $i^{th}$ configuration to said $(i+1)^{th}$ configuration at an instantaneous rate of (ky) switches per second when $x>z$ and to said $(i-1)^{th}$ configuration at an instantaneous rate of (−ky) switches per second when $x<z$.

15. The device of claim 14 wherein said pulsing means is for providing forward and reverse input pulses to said current switching means when $x>z$ and $x<z$, respectively, and wherein said current switching means, upon the receipt of one of said forward and reverse input pulses, switches said current controller from said $i^{th}$ configuration to said $(i+1)^{th}$ and said $(i-1)^{th}$ configuration, respectively.

16. The device of claim 15 wherein said pulsing means, when x is greater than z, produces one of said forward input pulses at the rate of $k(x-z)$ and said pulsing means produces one of said reverse input pulses, when z is greater than x, at the rate of $k(x-x)$.

17. The device of claim 9 including synchronizing means, coupled to an external source of a.c. current, the windings of said stator, and said field driving means, for bringing the phase of the a.c. current in said stator into coincidence with the phase of said external source of a.c. current.

18. The device of claim 1 including amplitude control means, coupled to each of said particular windings on said stator and to said current controller, for setting the level of said predetermined magnitude of said substantially steady amplitude current through said particular windings for each of said configurations to produce at said stator a current having a predetermined output amplitude.

19. The device of claim 18 wherein said synchronizing means includes first and second pulse shaping means, coupled to said source of external a.c. voltage and to said stator, respectively, for shaping the current received from said source of external a.c. voltage and from said stator, respectively, into first and second types, respectively, of substantially square wave pulses, said first and second types of square wave pulse occurring when the current in said external a.c. voltage and in said stator, respectively, passes through a zero value in a particular direction; pulse timing means coupled to said first and second pulse shaping means, for measuring the difference in time between the beginning of one of said first and second type of pulses and the beginning of the subsequent pulse from the other of said first and second types of pulse; and pulse inducing means, coupled to said pulse timing means and to said current switching means, for, when the period between said one of said first and second types of pulses and said subsequent pulse exceeds $1/k$, inducing said current switching means to switch from said $i^{th}$ configuration to said $(i+1)^{th}$ configuration.

20. The device of claim 19 wherein said amplitude control means includes d.c. amplifier means for producing a voltage in the windings of said rotor that will produce in the windings of said stator a voltage equal to said external line voltage.

21. The device of claim 19 wherein said varying means establishes a value of x equal to the frequency of the a.c. current on said external source times $(1/n)$.

22. The device of claim 9 wherein said transducer means, said current controller, said current switching means, said current timing means, and said pulsing means, each included digital electronic components.

23. A device for creating a magnetic field having an integral number of n pole pairs and rotating about a center of rotation at a speed of y rps. comprising:
(A) for each of said n pole pairs, three windings spaced substantially equidistant about said center of rotation;
(B) for each particular winding of the three particular windings of a particular pole pair, current means, coupled to said particular windings, for creating an a.c., sinusoidal current in each of said particular windings with a frequency of y Hz., said current in any one particular winding being 120° in phase ahead of the a.c. current in one of the remaining two particular windings and 120° in phase behind the current in the other of the remaining two particular windings, said current means including, for each one of said particular windings:
  (1) a current controller, coupled to the leads of said one particular winding, having k configurations, where k is a positive integer, and producing a predetermined magnitude of substantially steady amplitude current through said one particular winding for each of said configurations, the ratio of said magnitude of said current with said current controller in the $i^{th}$ configuration to said magnitude of said current with said current controller in the $j^{th}$ configuration, where i and j are positive integers not greater than k, substantially equal the ratio of the values of said sinusoidal wave at the phase angle positions $i/k$ and $j/k$ through a cycle of said wave;
  (2) current switching means, coupled to said transducer means and to current controller, for switching, for each $1 \leq i \leq k$, said current controller from said $i^{th}$ configuration to said $(i+1)^{th}$ configuration, where the $(k+1)^{th}$ configuration is the first configuration; and
  (3) current timing means, coupled to said current switching means, for inducing said switching means to switch from said $i^{th}$ configuration to said $(i+1)^{th}$ configuration at an instantaneous rate of (ky) switches per second.

24. The device of claim 23 wherein k is at least about 50.

25. The device of claim 24 wherein said current controller further includes pulsing means, coupled to said current switching means, for providing input pulses to said current switching means and wherein said current switching means, upon the receipt of one of said input pulses, switches said current controller from said $i^{th}$ configuration to said $(i+1)^{th}$ configuration.

26. The device of claim 25 wherein said pulsing means produces said forward input pulses at the rate of ky.

27. The device of claim 26 wherein each of said k configurations of said current controller for a particular winding includes a resistance, coupled to said particular winding and to a source of voltage, said source of voltage being substantially the same for each of said resistances for each of said k configurations, the ratio of the value of the resistance for said $i^{th}$ configuration to the value of the resistance for said $j^{th}$ configuration substantially equaling the inverse of the ratio of the value of said sinusoidal wave at the phase angle positions $i/k$ and $j/k$ through a cycle of said wave.

28. The device of claim 27 wherein, said current controller, when in said $i^{th}$ configuration, passes current from said voltage source through said $i^{th}$ resistance and through none of the other k resistances for said particular winding.

29. The device of claim 28 wherein k is no less than about 100.

* * * * *